(12) United States Patent
Wodtke et al.

(10) Patent No.: US 7,885,847 B2
(45) Date of Patent: Feb. 8, 2011

(54) END USER ORIENTED WORKFLOW APPROACH INCLUDING STRUCTURED PROCESSING OF AD HOC WORKFLOWS WITH A COLLABORATIVE PROCESS ENGINE

(75) Inventors: Dirk Wodtke, Aptos, CA (US); Nicolai Jordt, Angelbachtal (DE); Matthias Kruse, San Francisco, CA (US)

(73) Assignee: SAP AG, Walldorf (DE)

( * ) Notice: Subject to any disclaimer, the term of this patent is extended or adjusted under 35 U.S.C. 154(b) by 1616 days.

(21) Appl. No.: 10/841,809

(22) Filed: May 7, 2004

(65) Prior Publication Data
US 2005/0027585 A1 Feb. 3, 2005

Related U.S. Application Data

(60) Provisional application No. 60/469,051, filed on May 7, 2003.

(51) Int. Cl.
*G06F 15/02* (2006.01)
(52) U.S. Cl. ............. 705/9; 705/7; 705/8; 705/10; 709/217; 709/219; 715/700
(58) Field of Classification Search ............ 705/7–11; 707/1, 9, 10, 103, 204; 709/217–229; 715/700
See application file for complete search history.

(56) References Cited

U.S. PATENT DOCUMENTS 5,799,297 A * 8/1998 Goodridge et al. ........... 1/1

(Continued)

FOREIGN PATENT DOCUMENTS

EP 1033666 A2 9/2000

OTHER PUBLICATIONS

"Failure handling and coordinated execution of concurrent workflows" (Karnath, M.; Ramamritham, K.; Proceedings 14th International Conference on Data Engineering, Feb. 23-27, 1998, pp. 334-341, Feb. 23, 1998-Feb. 27, 1998 ISSN: 1063-6382, retrieved from IEEE Xplore.).*

*Primary Examiner* — Lynda C Jasmin
*Assistant Examiner* — Alan Miller
(74) *Attorney, Agent, or Firm* — Fountainhead Law Group PC

(57) ABSTRACT

In a structured workflow system, a configurable workflow engine provides mechanisms for executing and scheduling the work items in a defined way. End users use their discretion and define their own "local" processes and "local" rules for processing work items, or deviate from predefined processes. The configurable workflow engine might be installed at a server to organize workflows and business processes where end users can define processing steps for incoming work items by setting up rules and defining workflows as part of a local workflow structure. By defining these rules and workflows, the further processing steps of future incoming work items can be automated. When an administrator directs the workflow engine to move from a current phase to a next phase, the workflow engine deals with the incomplete items by allowing the administrator to carry over work items (or might do it automatically). End-user consultation might be included in the carry-over decisions. The carried over work items are added as parallel activities to the next phase. The workflow engine handles imposing and executing control flow dependencies between tasks, thus providing a smooth transition from totally unstructured work to semi-structured or completely structured work. When the workflow engine encounters semantically correlated work items/tasks, the process engine assumes that these work items/tasks belong to the same process instance.

19 Claims, 8 Drawing Sheets

U.S. PATENT DOCUMENTS

| | | | |
|---|---|---|---|
| 5,826,020 A * | 10/1998 | Randell | 709/202 |
| 5,826,239 A * | 10/1998 | Du et al. | 705/8 |
| 5,848,393 A * | 12/1998 | Goodridge et al. | 705/8 |
| 5,911,143 A * | 6/1999 | Deinhart et al. | 1/1 |
| 5,937,388 A * | 8/1999 | Davis et al. | 705/8 |
| 5,960,404 A * | 9/1999 | Chaar et al. | 705/8 |
| 5,987,422 A * | 11/1999 | Buzsaki | 705/9 |
| 6,023,765 A * | 2/2000 | Kuhn | 726/4 |
| 6,026,365 A * | 2/2000 | Hayashi | 705/9 |
| 6,041,306 A * | 3/2000 | Du et al. | 705/8 |
| 6,073,109 A * | 6/2000 | Flores et al. | 705/8 |
| 6,088,679 A * | 7/2000 | Barkley | 705/8 |
| 6,108,671 A * | 8/2000 | Ogawa | 707/204 |
| 6,157,934 A | 12/2000 | Khan et al. | |
| 6,202,066 B1 * | 3/2001 | Barkley et al. | 707/785 |
| 6,225,998 B1 * | 5/2001 | Okita et al. | 715/853 |
| 6,286,129 B1 * | 9/2001 | Agarwal et al. | 717/105 |
| 6,289,385 B1 * | 9/2001 | Whipple et al. | 709/229 |
| 6,334,146 B1 * | 12/2001 | Parasnis et al. | 709/217 |
| 6,499,024 B1 * | 12/2002 | Stier et al. | 706/50 |
| 6,546,364 B1 * | 4/2003 | Smirnov et al. | 703/22 |
| 6,606,740 B1 * | 8/2003 | Lynn et al. | 717/100 |
| 6,823,513 B1 * | 11/2004 | McNally et al. | 718/104 |
| 7,216,088 B1 * | 5/2007 | Chappel et al. | 705/11 |
| 7,222,086 B2 * | 5/2007 | Huffman | 705/11 |
| 7,308,702 B1 * | 12/2007 | Thomsen et al. | 726/1 |
| 7,386,797 B1 * | 6/2008 | Chatterjee et al. | 715/751 |
| 7,403,948 B2 * | 7/2008 | Ghoneimy et al. | 707/10 |
| 7,428,495 B2 * | 9/2008 | Dhar et al. | 705/8 |
| 7,493,379 B2 * | 2/2009 | Takizawa et al. | 709/223 |
| 2001/0039570 A1 * | 11/2001 | Stewart et al. | 709/205 |
| 2002/0040312 A1 * | 4/2002 | Dhar et al. | 705/8 |
| 2002/0052771 A1 | 5/2002 | Bacon et al. | |
| 2002/0075293 A1 * | 6/2002 | Charisius et al. | 345/704 |
| 2002/0078432 A1 * | 6/2002 | Charisius et al. | 717/102 |
| 2002/0138543 A1 * | 9/2002 | Teng et al. | 709/102 |
| 2002/0161733 A1 * | 10/2002 | Grainger | 706/45 |
| 2002/0161859 A1 * | 10/2002 | Willcox et al. | 709/219 |
| 2002/0184070 A1 * | 12/2002 | Chen et al. | 705/9 |
| 2002/0188597 A1 * | 12/2002 | Kern et al. | 707/1 |
| 2003/0004767 A1 | 1/2003 | Ohsaki | |
| 2003/0149714 A1 * | 8/2003 | Casati et al. | 709/100 |
| 2003/0171961 A1 * | 9/2003 | Hosali et al. | 705/7 |
| 2003/0181991 A1 * | 9/2003 | Chau et al. | 700/1 |
| 2004/0019512 A1 * | 1/2004 | Nonaka | 705/8 |
| 2004/0025048 A1 * | 2/2004 | Porcari et al. | 713/200 |
| 2005/0027585 A1 * | 2/2005 | Wodtke et al. | 705/9 |
| 2006/0143246 A1 * | 6/2006 | Phillips et al. | 707/204 |
| 2007/0168871 A1 * | 7/2007 | Jenkins | 715/751 |

* cited by examiner

FIG. 5

SAP®

| Home | Yahoo | Rooms | Development | Project Planning | ES |

Overview • Ad hoc Workflow Task Force • GBU IP Base Components • DKG_PA

[Search]

Team Members

Owner  Tim G.

Team Leader
 Tim G.
Team Member
 Kim H.
 John I.
 Beth J.
 Lucy A.

Team Tasks

[All Items ▽]

| | Item | Assigned To | Due | Assigned By | Status |
|---|---|---|---|---|---|
| ☐ | Tim's Task | Tim G. | 04/11 | Kim | Not Yet Started |
| ☐ | Kim's Task | Kim H. | 04/11 | Tim | Not Yet Started |
| ☐ | John's Task | John L. | 04/11 | Kim | Not Yet Started |

[New] [Edit]          [Smart Collaboration]

Team News

| | | Home | Yahoo | Rooms | Development | Project Planning | ES |
|---|---|---|---|---|---|---|---|
| | Overview • Ad hoc Workflow Task Force • GBU IP Base Components • DKG_PA | | | | | | |

Search

Team Members

Owner  Tim G.

Team Leader
Tim G.

Team Member
Kim H.
John I.
Beth J.
Lucy A.

Team News

Team Tasks

All Items ▽

| | Item | Assigned To | Due | Assigned By | Status |
|---|---|---|---|---|---|
| ☐ | Phase 1 | | | | |
| ☐ | Tim's Task | Tim G. | 04/11 | Kim | Not Yet Started |
| ☐ | Kim's Task | Kim H. | 04/11 | Tim | Not Yet Started |
| ☐ | John's Task | John L. | 04/11 | Kim | Not Yet Started |
| ☐ | Phase 2 | | | | |
| ☐ | Phase 3 | | | | |

[New] [Edit] [New Step] [Return] [Save]
[Move Up] [Move Down] [Delete] [Start Process]

END USER ORIENTED WORKFLOW APPROACH INCLUDING STRUCTURED PROCESSING OF AD HOC WORKFLOWS WITH A COLLABORATIVE PROCESS ENGINE

CROSS-REFERENCES TO RELATED APPLICATIONS

This application claims priority from co-pending U.S. Provisional Patent Application No. 60/469,051 entitled "An End User Oriented Workflow Approach Including Structured Processing of Ad Hoc Workflows with a Collaborative Process Engine" filed May 7, 2003 which is incorporated by reference herein for all purposes.

BACKGROUND OF THE INVENTION

Collaboration takes place whenever humans and/or computer applications work together to accomplish a common goal or compatible goals. For the last two decades, many organizations and individuals have considered electronic collaboration of distributed teams one way to achieve higher productivity and improve the quality of their work products. Various collaboration technologies have been introduced to provide solutions in the areas of electronic communication, coordination, and content sharing. However, comprehensive solutions that fully realize the promises of electronic collaboration remain an elusive goal.

Early efforts for developing software systems to support asynchronous collaboration were carried out by research projects in CSCW (Computer Supported Cooperative Work). While such research efforts resulted in products that penetrated the market, such as Lotus Notes, these early groupware products failed to deliver anything more than marginal improvements to existing e-mail and document management solutions. In the late 1990's, the basic ideas found in early tools for asynchronous and synchronous collaboration where adopted by web browsers and through this path they have impacted the work habits of many people.

Today, technology and tools aimed to support team collaboration are being introduced in many product areas in the software industry. New web-based groupware systems, such as Groove and NetMeeting, extend the basic web browser capabilities by providing joint activity tools (e.g., audio communication, instant messaging, and content sharing tools). Traditional groupware vendors provide software products (e.g., Lotus Sametime and QuickPlace) supporting more specialized collaboration activities such as electronic presentations and meetings. Standalone workflow systems (e.g., Staffware) and workflow engines embedded in EAI platforms (e.g., Vitria, TIBCO, BEA) and ERP systems (e.g., SAP), already support efficient coordination of prescribed collaboration activities and begin to introduce flexible workflows to support a combination of repetitive and ad hoc/optional collaboration activities. Vendors of enterprise-wide content management servers (e.g., Documentum, Vignette, OpenMarket, BroadVision, FileNET) are introducing new products that include basic tools for electronic collaboration. Finally, domain-specific tools for collaborative design, learning, and product data management are steadily gaining new users and entering new markets.

The landscape of products and the number of technologies aiming to support collaboration are expanding and the collaboration technologies are improving. However, the current collaboration tool landscape is fragmented, and the network infrastructure currently cannot effectively support some collaboration tools, such as basic tools for screen and application sharing. The fragmentation of the collaboration tool landscape is due to various reasons such as the fact that none these technologies provides a complete collaboration solution by itself. Different technologies and products offer different subsets of capabilities and tools. Furthermore, since the majority of the provided tools are general purpose, it may be necessary to develop application-specific tools and user interfaces, e.g., for intelligence gathering.

The scalability, and therefore the size of distributed electronic teams, that current technologies can support varies significantly. In particular, many groupware tools that support joint activities are only appropriate for small groups (i.e., teams of less than ten people). On the other hand, technologies that scale well, e.g., systems for content and workflow management, lack essential groupware tools.

Production workflow systems are known. In some workflow systems, workflow is a structured into instances and in a large a structured workflow system, thousands of workflow instances might be processed daily. Workflow might also be done using unstructured methods. Unstructured methods include spontaneous interactions, such as might be done with e-mail, chat, telephone, etc. The former works well to coordinate a large group and the latter works well in an informal, small group of collaborators.

Structured workflow has advantages of being trackable and testable. Structured workflow is trackable in that an analyst can later determine how a process proceeded and can identify other performance data and data underlying the work being done. Unstructured workflow, on the other hand, does not have these benefits and analysis might require manually reviewing e-mails, notes, etc. and would not be informed by informal interactions and communications that are not stored in retrievable form.

Unstructured workflow does have its advantages, in that the collaborators are not tied to a structure devised by an administrator. Of course, this might be a disadvantage, as an administrative team would more likely have the expertise and time to design a workflow optimized for the project at hand. In some cases, collaborators within a structured workflow system might use informal channels, such as manual routing, e-mail, etc., to bypass the structured workflow, but then the utility of the structure is diminished.

BRIEF SUMMARY OF THE INVENTION

In a structured workflow system, a configurable workflow engine provides mechanisms for executing and scheduling the work items in a defined way. End users use their discretion and define their own "local" processes and "local" rules for processing work items, or deviation from predefined processes. The configurable workflow engine might be installed at a server to organize workflows and business processes where end users can define processing steps for incoming work items by setting up rules and defining workflows as part of a local workflow structure. By defining these rules and workflows, the further processing steps of future incoming work items can be automated.

With improved workflow engines described herein, incomplete steps in a phase of a process are identified and dealt with more intelligently. When an administrator directs the workflow engine to move from a current phase to a next phase, the workflow engine deals with the incomplete items by allowing the administrator to carry over work items (or might do it automatically). End-user consultation might be included in the carry-over decisions. The carried over work items are added as parallel activities to the next phase.

According to an embodiment, a structured workflow system includes a first data storage for structured work items, a second data storage for local work items, and a workflow engine. Each work item is a data object representing a task to be performed by an actor. An actor is one or more of a person, a group of persons and a machine. The structured work items are defined for a business process by a business process generator. A local work item is a data object input in response to the operation of the business process and a variance from the business process defined by the business process generator. The workflow engine processes work items and local work items, including processing links between at least one work item and one local work item such that constraints on the business process set by the business process generator are followed in processing local work items.

According to an embodiment, the actor is assigned a first set of permissions representing security constraints on modifying and/or accessing elements of the first data storage. An operator of the business process generator is assigned a second set of permissions, and the second set of permissions includes at least one permission not included in the first set of permissions.

The workflow engine handles imposing and executing control flow dependencies between tasks, thus providing a smooth transition from totally unstructured work to semi-structured or completely structured work. When the workflow engine encounters semantically correlated work items/tasks, the process engine assumes that these work items/tasks belong to the same process instance.

A further understanding of the nature and the advantages of the inventions disclosed herein may be realized by reference of the remaining portions of the specification and the attached drawings.

BRIEF DESCRIPTION OF THE DRAWINGS

The included figures describe aspects of the present invention.

FIG. 4 illustrates aspects of configurable workflows.

FIG. 5 illustrates a modified version of a user interface for creating tasks in a collaboration room.

FIG. 6 illustrates an example of a user interface usable for arranging collaboration tasks.

FIG. 7 illustrates a user interface that allows end-users to structure tasks on the fly.

FIG. 8 illustrates a phase changing process.

DETAILED DESCRIPTION OF THE INVENTION

Figure 1:
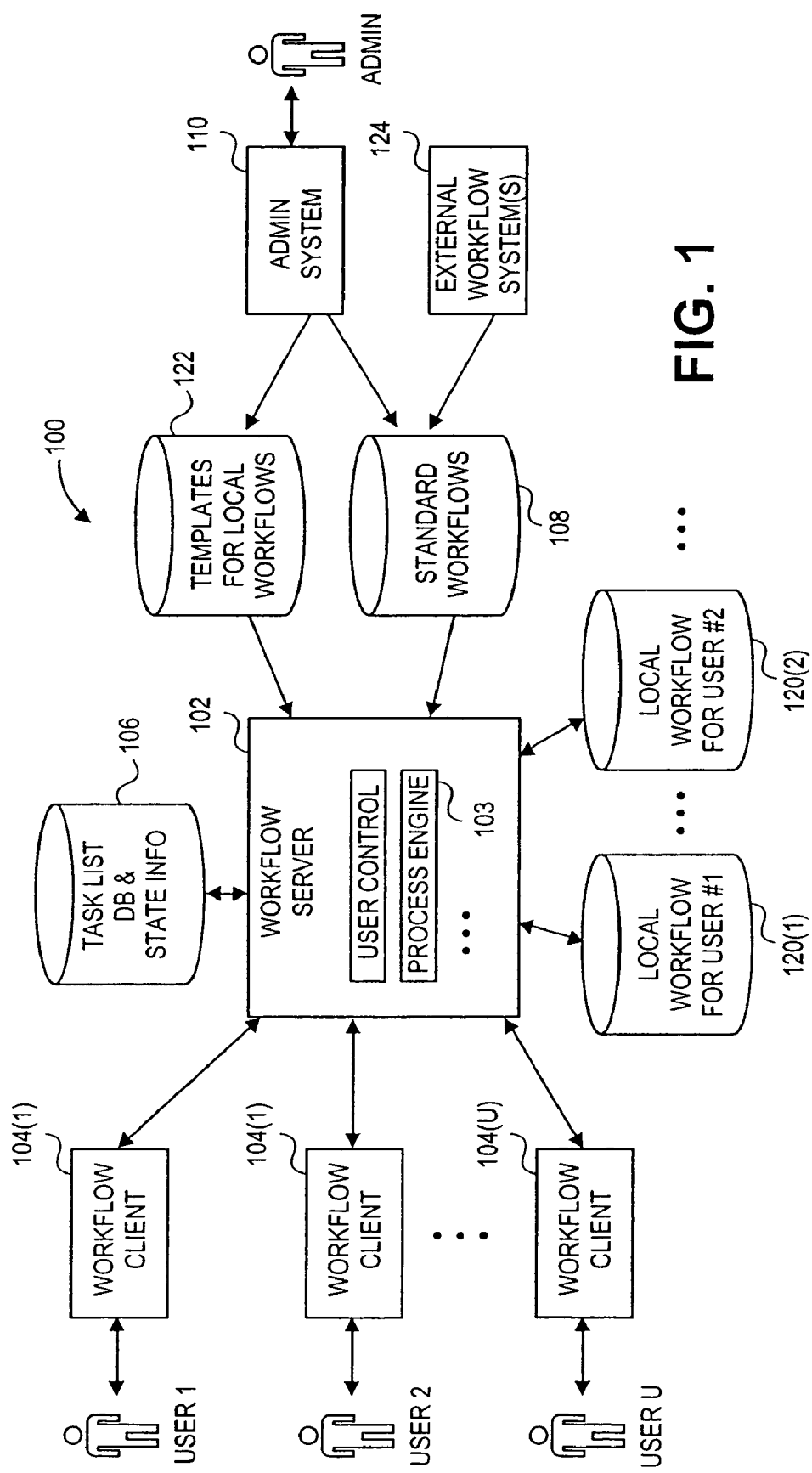
FIG. 1 illustrates an example of a configurable workflow system according to embodiments of the present invention.

In a structured workflow system, a project is defined by a set of processes, each of which might have multiple steps, tasks, triggers and/or actions (work items). A workflow engine provides mechanisms for executing and scheduling the work items in a defined way.

Some groupware applications allow users to jointly define tasks of a project, more or less just storing the task information and making sure that these tasks are assigned to task owners, without really being able to control execution orders for the tasks or other control flow dependencies dealt with. For example, most groupware applications could not address a workflow such as: "Execute task B after task A, but only if the value of X is greater than Y. In all other cases, execute task C immediately after task A."

To address this need, the workflow engine handles imposing and executing control flow dependencies between tasks, thus providing a smooth transition from totally unstructured work to semi-structured or completely structured work. When the workflow engine encounters semantically correlated work items/tasks, a process engine assumes that these work items/tasks belong to the same process instance. In the absence of explicitly stated control flow dependencies, the process engine assumes that all represent parallel tasks. When end users define, e.g., an order for some or all of these tasks, a new version of the process definition is generated by explicitly reflecting these control flow dependencies.

In real life scenarios, unanticipated activities or frequent execution order changes need to be accommodated, while not eliminating the benefits of a structured workflow system. End users are expected to cope with these changes. Frequently, they realize that they cannot execute their work (items) without further consulting with colleagues or performing some other steps. The Workflow systems described herein accommodate this, as end users use their discretion and define their own "local" processes and "local" rules for processing work items, or deviate from predefined processes.

In an implementation, a configurable workflow engine is provided. The configurable workflow engine might be installed at a server to organize workflows and business processes where end users can define processing steps for incoming work items by setting up rules and defining workflows as part of a local workflow structure. By defining these rules and workflows, the further processing steps of future incoming work items can be automated. The input for local workflow structure might be work items stemming from any of several supported worklist server systems. In addition to defining and instantiating processes, process definitions can be modified by process participants while the processes are under execution. Examples of process modifications include insertion/modification/deletion of activities, bypassing of process steps, and introducing interaction (via routing, etc.) of other/additional process participants not contemplated in the global workflow.

One example of a configurable workflow system 100 is shown in FIG. 1. As illustrated there, users interact with a workflow server 102 via workflow clients 104. As number of different workflow clients are possible, as shown in other figures. In interactions with workflow server 102, users can view tasks, change state of tasks (from pending to done, removed, transferred, obsoleted, etc.) and the like. The tasks, state information and other data needed or used in the workflow process is stored in storage 106. Standard workflows are stored in storage 108 and are typically provided by an administrative system 110, but might be also provided by an external workflow system 124.

Using these components, a user can perform tasks in structured manner and have progress tracked by workflow system 100. When a user desires or needs a local workflow to handle end-user specified flows, the user might also use workflow clients 104 to input local workflows, which can be stored by workflow server 102 into storage 120 on a per user basis, although workflow server 102 (e.g., by a process engine 103 therein) might propagate local work items to other affected users. To provide some structure for users to start with, templates, stored in storage 122 by administrative system 110, might be coupled to workflow server 102.

In some embodiments, the storage areas shown in FIG. 1 are not distinct, but are merely different allocations of a common storage area, such as a database or other data or file storage. Other variations and organizations are also possible. For example, the workflow system might be integrated in with a portal server.

Figure 2:
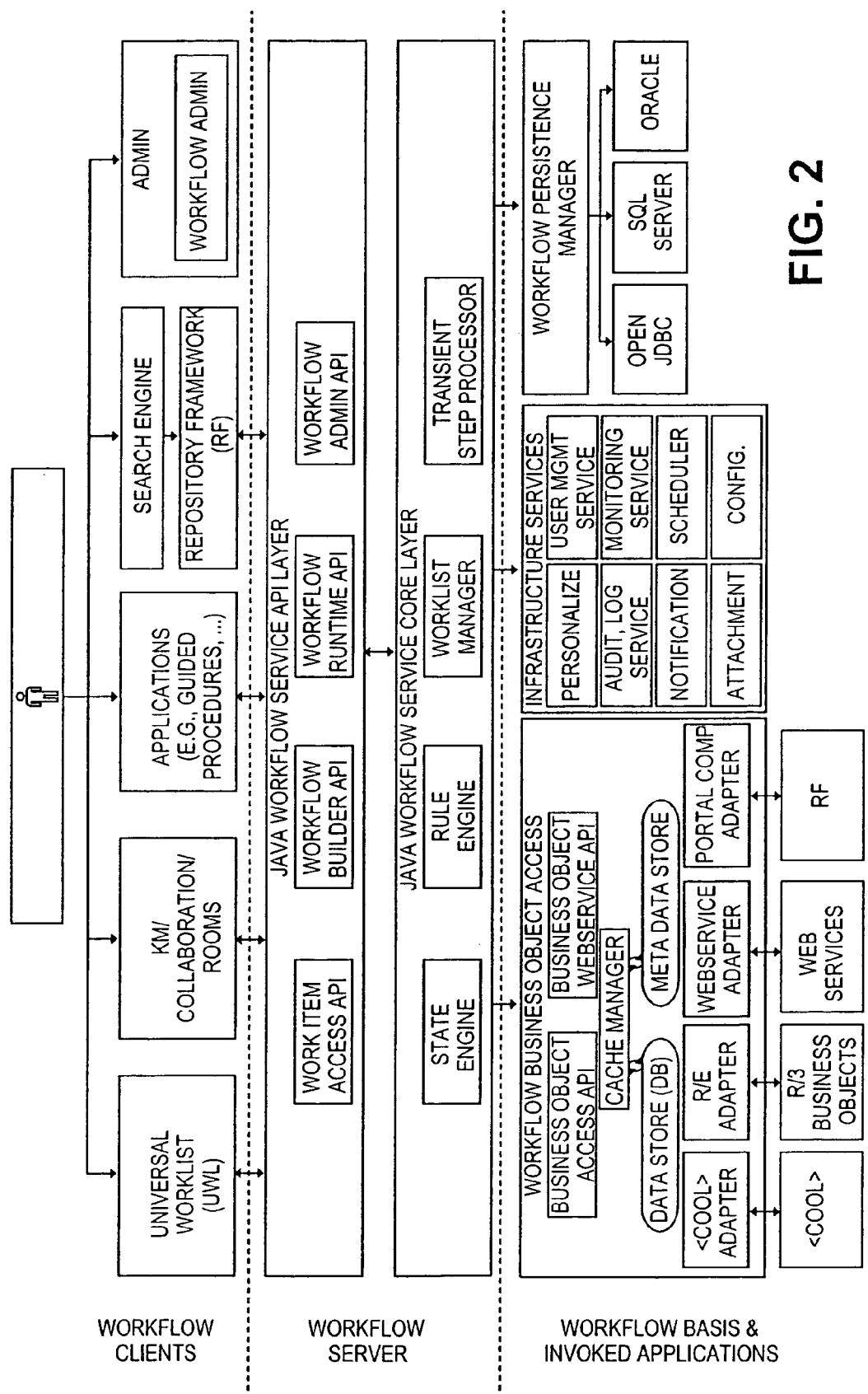
FIG. 2 illustrates another possible arrangement or view of a workflow system.

FIG. 2 illustrates another possible arrangement or view of a system. As illustrated there, users interact with one or more workflow clients, such as the Universal Worklist ("UWL"), described in more detail in U.S. patent application Ser. No. 10/841,241, filed May 7, 2004, entitled "Universal worklist service and user interface," naming Matthias Kruse, Nicolai Jordt, and Dirk Wodtke as inventors, which is incorporated by reference herein for all purposes. The workflow clients interact with a Java workflow service API layer of a workflow server, which interacts with a core layer that in turn interacts with workflow objects, data and other structures as shown.

Figure 3:
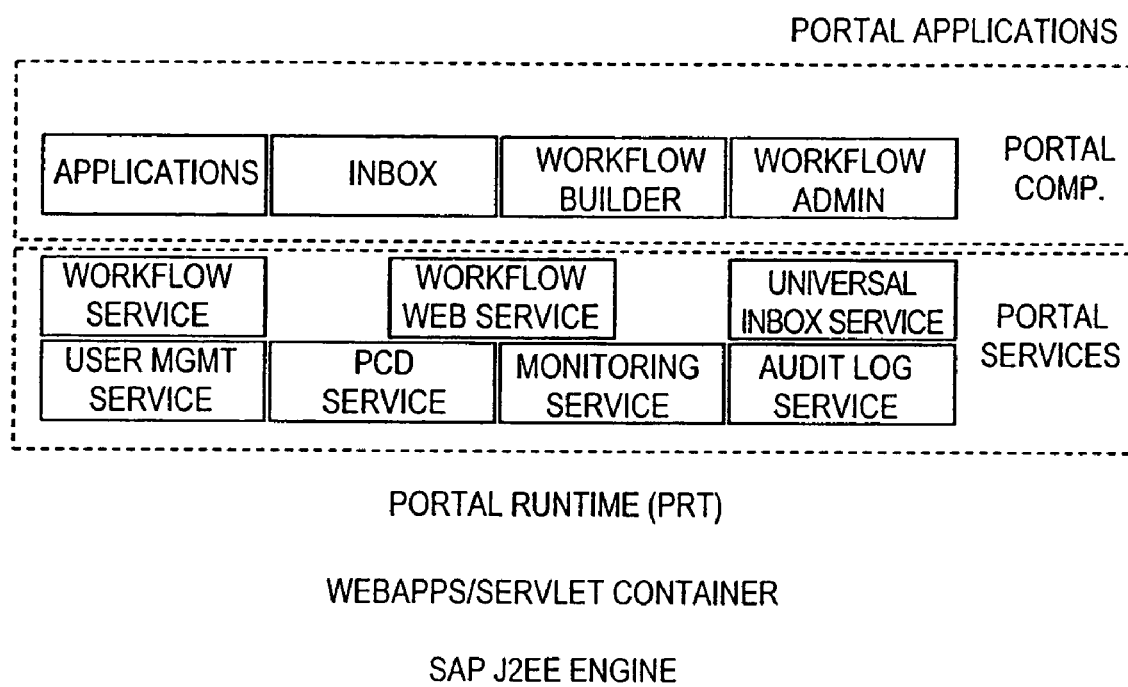
FIG. 3 illustrates workflow components supported as portal applications.

FIG. 3 illustrates workflow components supported as portal applications.

The workflow engine might include a template generator for creating new versions of a process definition when an end user modifies the process definition to accommodate local conditions. After the creation of a new template version, the run time information of the process instance is merged into the new process definition. Thus, the next activity in the process instance already adheres to the new version of the process definition.

In many workflows, processes are organized in phases, where each work item in one phase is expected to be completed before the end of that phase and the start of the next phase. Some traditional workflow systems enforce a requirement that a subsequent phase can only be started after finishing all work items in the current phase, while other systems allow for a phase change wherein all open items in the current phase are marked as completed or obsolete and then moves on to the next on to the next phase. Both approaches are limited because they are either not flexible enough or potentially forfeit necessary follow-ups.

An ad hoc workflow engine might include seamless integration with other applications, so that a user might use other tools to create ad hoc workflows. An ad hoc workflow might include simple rules, such as rules for delegation, substitution, escalation, scheduling per step, etc. and more complex operations such as parallelization, use of alternatives, conditional operations, etc. While users might be free to make whatever informal workflows they deem necessary for their local operations, system administrators might provide templates to somewhat structure the user's workflow. Thus, the user might opt to select from among a plurality of templates based on skeletal outlines of required steps. Workflows might include steps to take, notifications to make, and other work items. An ad hoc engine might be implemented on a platform such as SAP's NetWeaver platform for most effective use of resources.

With improved workflow engines described herein, incomplete steps in a phase of a process are identified and dealt with more intelligently. When an administrator directs the workflow engine to move from a current phase to a next phase, the workflow engine deals with the incomplete items by allowing the administrator to carry over work items (or might do it automatically). End-user consultation might be included in the carry-over decisions. The carried over work items are added as parallel activities to the next phase.

One workflow engine, as described herein, is developed in Java and runs on SAP's web application server WebAS 6.20 and 6.30. It includes an easily configurable approval process for document approvals in a Knowledge Management application (KM) and user self registration in a User Management Engine (UME). In a specific implementation, the workflow engine enables a universal worklist in a portal (UWL).

Aspects of the present invention allow ad hoc processes to be handled in a structured manner. Each interaction between users has some form of implicit or explicit process associated with it. For example, talking on the phone begins with "Hello" and ends with "Goodbye", e-mail has defined protocols and formats, but is unstructured communication.

A flexible engine to support many of these processes would benefit users. For ad hoc process management to be successful, many principles associated with traditional workflow have to be de-emphasized. For example, workflow is traditionally administrator-centric, but end users typically drive ad hoc processes. Thus, an administrator defines a process and the end user is a participant in a rigid workflow process. This is not an effective route for addressing highly variable processes related to user interaction.

Ad hoc process management allows users to define workflow processes, where a user can be both an administrator and a participant, to initiate a process, alter a process, complete a step, and track the status of the process they initiate or participate in. Embodiments of the ad hoc process management systems described here might provide a service that can connect participant actions and steps. Supplementing traditional structured mechanisms allow users to add ad-hoc sub processes and ad hoc sub-processes within processes.

Ad Hoc Workflow and Collaboration using Structured Approaches

Suppose users Dirk, Christian, Matthias, Cyrille and Tim are all part of a team responsible for writing a whitepaper. Traditionally, this would require a flurry of e-mails and continuous status checking through these e-mails as no process or central mechanism for editing exists. A system such as one described herein might allow users to perform a number of different tasks to coordinate work and communicate effectively about ongoing work. An ad hoc process management engine, such as those described herein, would allow users to organize user work processes around the work they are performing.

Figure 4A:
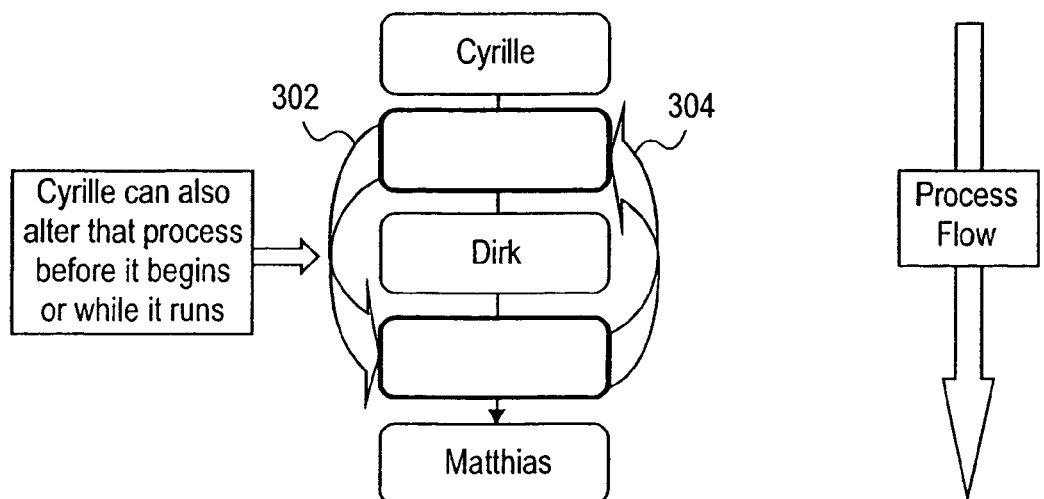
FIG. 4A shows a standard workflow for a document review process.
Figure 4B:
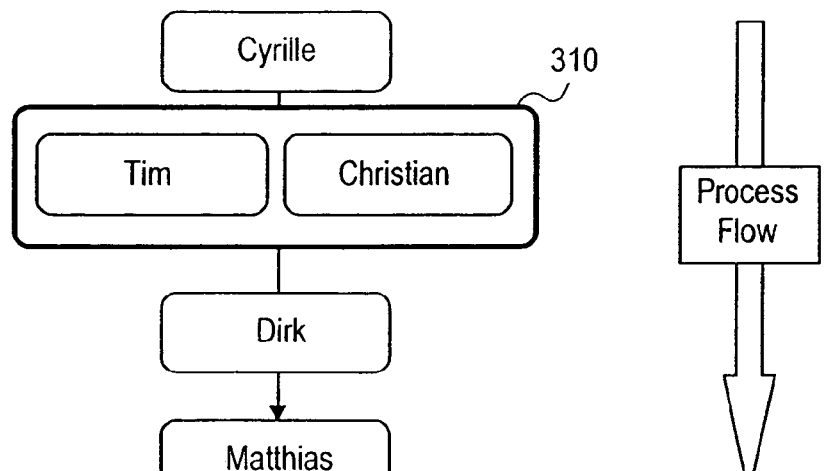
FIG. 4B shows an assignment of a task to a collaboration room of two users.
Figure 4C:
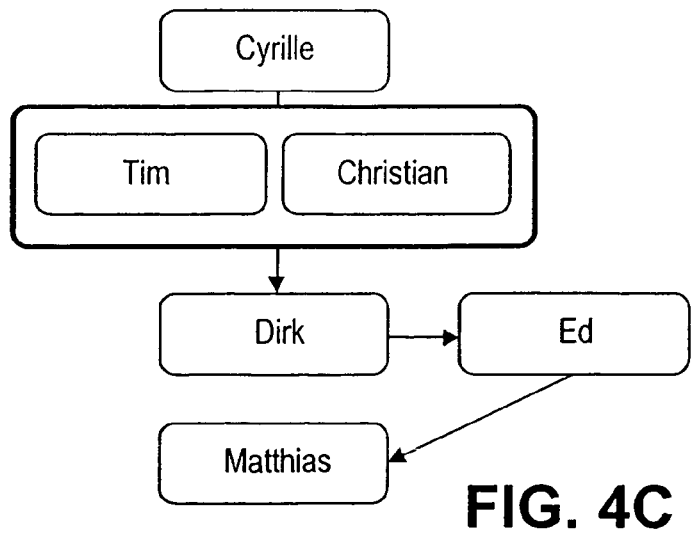
FIG. 4C shows a process that is modified by an end-user.

FIG. 4 illustrates aspects of configurable workflows. In the example of FIG. 4A, an administrative user "Cyrille" generates a workflow and provides that as the standard workflow for a particular document review process. The user "Cyrille" as an administrator, sets up the process wherein Christian reviews the document first, then Dirk, then Tim, and then Matthias. As an administrator, Cyrille can alter the order as illustrated by arrows 302, 304. As shown in FIG. 4B, Cyrille can assign the review to a collaboration room 310, which is an organizational construct wherein a task is not assigned to a single person, but can be done by one or more persons associated with the collaboration room. As shown in FIG. 4B, some users can be outside the room and others can be inside the room. As illustrated in FIG. 4C, an end-user ("Dirk", or other authorized user) can alter the process flow with an ad hoc workflow, which is user-initiated but still handled by a structured workflow system.

A workflow engine such as one described herein bridges the gap between workflow and groupware, such that an end user can operate on them in an integrated manner. A knowledge management ("KM") system typically represents pieces of work that are often manual processing steps taken by individuals assigned those tasks. Workflow items are often treated differently, as definitions of a future pieces of work, either by an automated process or an individual, assigned to an identified individual, a set of more than one individual, or a role resolved after assignment, such as at run-time. Workflow items are typically embedded in a control flow.

Work items can represent manual steps (similar to knowledge management tasks) or computerized steps where the work item owners are supposed to enter data in application screens and to hit application buttons. A workflow work item represents a piece of work assigned to one user or a set of users by a workflow system. Work items unambiguously belong to workflow instances (instantiated workflow definitions) and keep references to the definition of the work. Work items are often accessible to end users through devices such as a UWL that allows for searching, filtering and manipulation operations such as forward, reject, execute, resubmit, etc.

In some of the workflow engines described herein, KM tasks and workflow work items are integrated from a user's perspective. In the model shown in FIG. 1, KM tasks can be stored in a KM Repository Framework (RF) whereas Workflow work items and Workflow activities are directly stored in a database. For performance reasons, databases are preferred for workflow work item data. For example, queries issued by end users from the UWL have to meet high performance requirements which cannot be easily met by an RF. On the other hand, by using the RF as storage, many KM infrastructure services such as an attachment service, a subscription service, a versioning service, a search engine, etc. can easily be used.

To keep consistency among KM tasks and work items, mutually registered callbacks can be used. Whenever a KM task is started outside of a workflow, a work item is created. Whenever a KM task is defined outside of workflow that is not immediately started, no work item is created. However, when this task is put into a workflow template, a workflow activity is created referencing the KM task. In turn, whenever the workflow engine executes an activity which requires the creation of a work item that is not yet associated with a KM task, a KM task is created.

By keeping KM tasks and workflow data consistent and exposing work items through an RF provider adapter, portal tools such as search engines can be used for running end user friendly queries on process data. Usually process data is not amenable to traditional search engines.

FIG. 5 illustrates a modified version of a user interface for creating tasks in a collaboration room. Note the "Smart Collaboration" button. Using that button, users can arrange already entered tasks into a structured process. FIG. 6 illustrates one example of a user interface usable for arranging such tasks. Upon clicking the "Save" button, a workflow template is created. All KM tasks that have been entered are treated as Workflow activities. Upon hitting the "Start Process" button, the generated workflow template is instantiated and a workflow instance will be created. During the execution of the workflow instance for each KM task, a corresponding work item is created. This way, an integration of KM tasks and Workflow work items is achieved.

Figure 7:
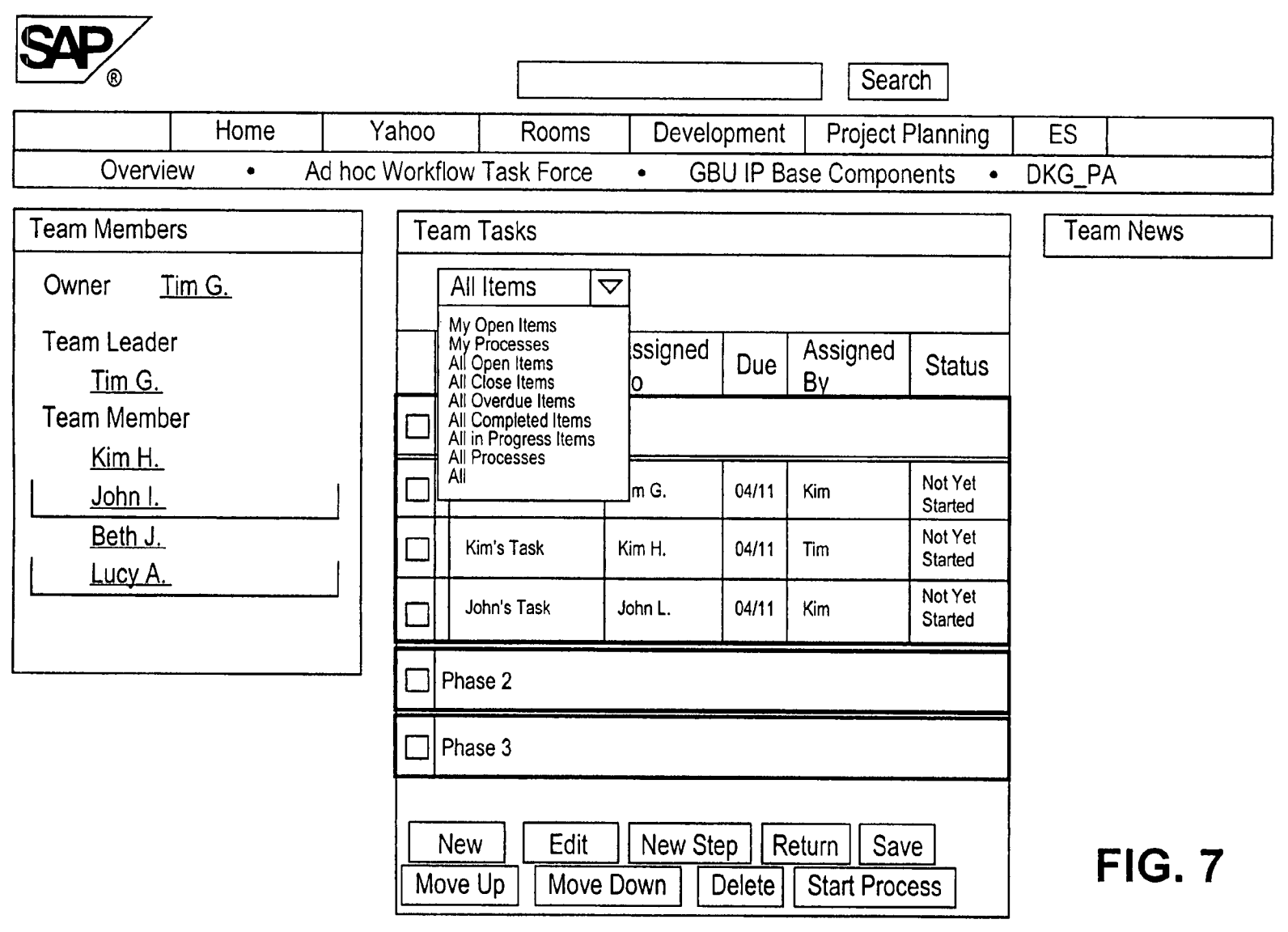

FIG. 7 illustrates a user interface where two new categories of items are listed under "Team Tasks": "My Processes", "All Processes". These two entities list processes that have been composed by clicking on the "Smart Collaboration" button. The latter ones are available to all room participants. This, in effect, allows an end user to structure tasks on the fly.

Variations on Ad Hoc Processing of Work

Traditional workflow systems allow for executing processes defined by process administrators skilled at developing processes. Typically, these processes are quite elaborate, optimized and very efficient. Their purpose is to implement business policies and enforce consistent execution of processes. These production workflow processes are typically tested thoroughly before they are deployed.

End users typically do not have any intention to define processes that all others in the company have to follow. End users do not invest much time (or no time at all) in testing the processes they might define. If they encounter problems with their processes, they want to be able to change them on the fly, i.e., while they are running. They might want to share their processes with others and invite other people as workflow participants in their personal processes.

If work items originate from legacy workflow systems, those systems would typically not provide any support for deviating from the standard way of executing work items. However, end users who receive such work items in many cases do not know up front how to execute the work items. Usually the execution of their work items is at their discretion: They may want to check with colleagues before they approve or disapprove a request, they might want to first get approvals from colleagues for sub tasks represented by the work item, or they might want to set up their own rules for dealing with incoming work items. In summary, end users would benefit from tool support for these situations in terms of deviating from the predefined processing path or "learning capabilities" of the system in order to cope with similar future situations efficiently.

A Universal Worklist (UWL) could serve as the main entry point for end users. From the UWL, end users can define their private processes. Alternative end user entry points might be portals, such as SAP's Rooms portal system. If a user is a member of a room, they can define processes from the room user interface. As a default, these process definitions might be visible within this room only.

A workflow engine might provide an API for creating, maintaining, and deploying workflow templates. This API can be called from a variety of tools. For example, applications can provide wizards that allow for defining a process that finally calls the workflow API. A graphical editor might be used for composing workflow definitions graphically.

The workflow engine supports changes of workflow templates while they are executing. End users can add steps, change the sequence of steps, and modify steps in the workflow process. Every time the workflow definition is changed, a new version of the workflow definition should be created. The next step of the corresponding workflow instance already adheres to the update workflow process definition.

In addition to executing manually work items, users can set up rules that automate the processing of work items. These rules can refer to a variety of data sources, such as work item attributes (e.g., creation date, work item type, creator of the work item, etc.), associated business object and its attributes (e.g., document, length of a document, purchase order, amount of a purchase order, etc.), and context of the belonging workflow instance (preceding step in the process, due date of the process, etc.).

Handling of Obsolete Activities/Work Items

For simplicity, the user interaction is designed to support processes that are organized in phases. Phases are processed sequentially. New phases can be created, and already entered phases can be deleted. Tasks get assigned to phases. By assigning tasks to phases, the order in which the tasks will be executed is defined. If there is more than one task assigned to a phase, all tasks in this phase will be executed in parallel by the workflow engine. Usually, processes are organized hierarchically, i.e., processes typically comprise activities that can be processes themselves. The highest level activities in a process can be conceived as phases of the whole process. If a strict adherence to the hierarchy is required, a phase can only be started if its predecessor phase has been completed.

For each phase, properties can be defined that detail on which condition a phase will be executed and/or terminated. Among other advantages, this allows for defining alternative branches in processes or an accelerated execution of processes. While such branching is useful, it often might require a trade-off of delaying a phase closing to ensure that all items in the phase are complete or moving on and possibly forgetting items.

There are situations where it is safe (or because of time constraints, required) to start the processing of a successor phase although the current phase has not been completed. In these cases, outstanding activities of the current phase will be changed to "obsolete". After a while, nobody will remember these obsolete activities any more. This can have detrimental effects on the success of the whole process, since expected deliverables cannot be achieved.

Using the workflow systems and smart collaboration described herein, a defined way for dealing with obsolete activities or work items is provided. Instead of automatically changing their states to "obsolete," these activities are moved to the successor phase or any other phase. End users who want to start the next process phase can enter in a user dialog for each obsolete activity indicating what should happen to this activity. Setting outstanding activities to "obsolete" is one option. Other options are to assign them (or some of them) to other phases of the process. In this case, the position of these activities should be defined by the user.

Figure 8A:
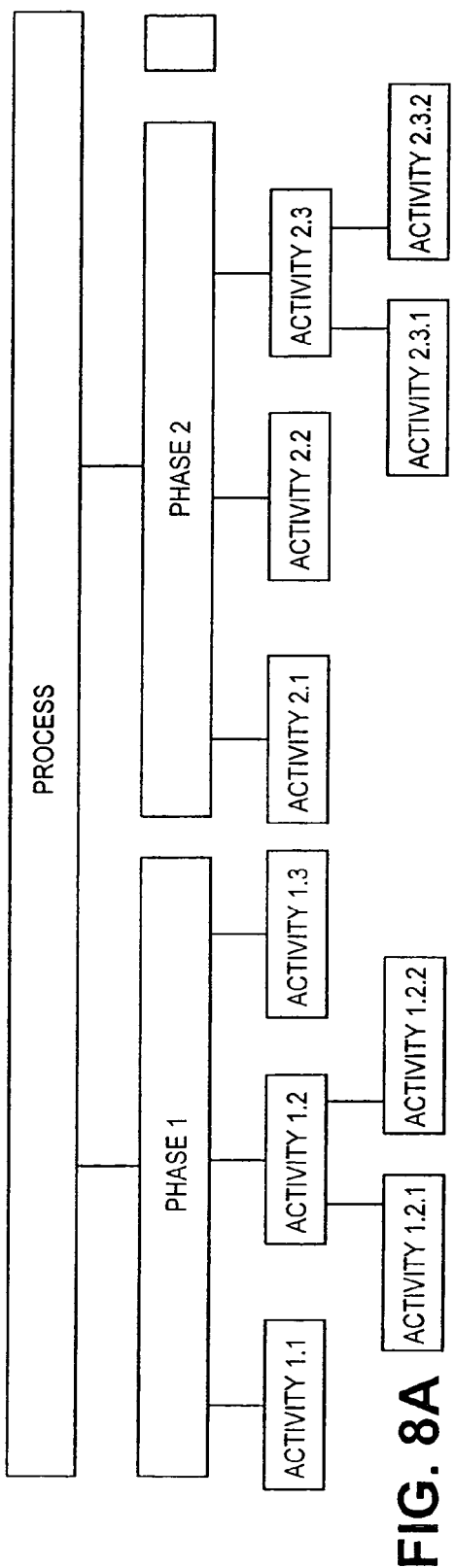
FIG. 8A shows a hierarchical process with finished and open work items.
Figure 8B:
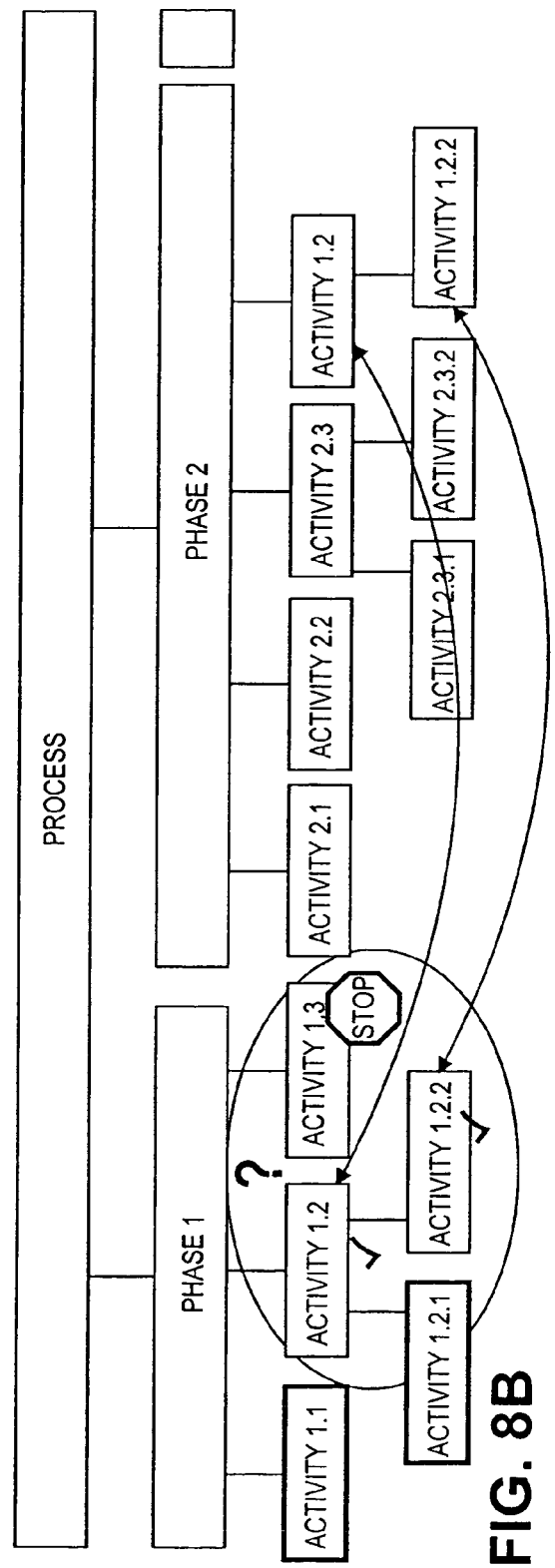
FIG. 8B illustrates a state of work items following phase change with item carry-over.

The two following diagrams illustrate this. FIG. 8A shows a hierarchical process where some activities (Activity 1.1 and Activity 1.2.1) have already been finished. Some other activities of Phase 1 (Activities 1.2.2 and Activity 1.3) are still open. If the process owner decides to start the processing of Phase 2 she has to decide what should happen to the open activities. This is illustrated in FIG. 8B. The process owner decides to move Activity 1.2.1 to Phase 2 and because of that also to move Activity 1.2 to Phase 2. Furthermore, she decides to set Activity 1.3 obsolete.

Novel workflow systems have now been described. The core of a workflow engine can be implemented as a state engine. For in-memory workflow execution, a transient step processor can be provided. For evaluating rules, a basic rule engine can be provided. Work items are created and administered by the worklist manager. Specific embodiments of a collaboration solution that scales to an entire organization and offers the appropriate collaboration tools may include flexible business processes and coordination conflict resolution, policy-based team coordination, business rules for resource, role, user, and context management, policy-based access, awareness provisioning and customized monitoring, decision support for teamwork, collaboration ontologies, dynamic team, workplace, policy, and process creation, supply chain management for collaboration products, scalable tools for joint activities and large teams, middleware for collaboration technology integration, and/or tools developed to support teamwork in specific application domains (e.g., intelligence gathering, crisis management, product data management).

While the present invention has been described using a particular combination of elements, it should be recognized that other combinations of elements are also within the scope of the present disclosure. The above description is illustrative but not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. In a workflow server that implements a structured workflow system, a computer-implemented method of controlling the workflow server, comprising:

storing structured work items in a first data storage, wherein each work item is a data object representing a task to be performed by an actor, wherein an actor is one or more of a person, a group of persons and a machine, the structured work items being defined for a business process by a business process generator;

storing local work items in a second data storage, wherein a local work item is a data object input in response to the operation of the business process and in response to a variance from the business process defined by the business process generator;

processing work items and local work items by a workflow engine, including processing links between at least one work item and one local work item such that constraints on the business process set by the business process generator are followed in processing local work items, wherein the actor is assigned a first set of permissions representing security constraints on modifying and/or accessing elements of the first data storage, wherein an operator of the business process generator is assigned a second set of permissions, and wherein the second set of permissions includes at least one permission not included in the first set of permissions, wherein the business process includes a first phase and a second phase, wherein the second phase follows the first phase, wherein each of the work items and the structured work items is in one of the first phase and the second phase, and wherein the constraints on the business process are defineable by the actor to move a designated work item from the first phase to the second phase.

2. The method of claim 1, wherein the at least one permission not included in the first set of permissions is a permission to perform at least one of creating, modifying and deleting business processes from which structured work items in the first data storage are defined, and wherein the first set of permissions includes permission to perform at least one of creating, modifying and deleting local work items.

3. The method of claim 1, wherein the business process generator is a computer system operated by a human to input the business process.

4. The method of claim 1, wherein the business process generator is an automated computer process.

5. The method of claim 1, wherein the local work items comprise one or more of a deviation from the business process, a local rule for handling work items, a local process, and an additional routing of an object.

6. The method of claim 1, wherein a portal server is coupled to the workflow engine to handle inputs from, and outputs to, the actor.

7. The method of claim 1, wherein the actor comprises a plurality of end users operating as a collaboration team and at least one work item represents work to be done by an end user on the collaboration team.

8. The method of claim 1, wherein a third data storage is configured to store local work processes comprising a first set of business processes generated by an actor in variance from a second set of business processes defined by the business process generator.

9. The method of claim 8, wherein the first data storage, second data storage and third data storage are allocated areas of a common data storage device.

10. The method of claim 1, wherein the first data storage and second data storage are allocated areas of a common data storage device.

11. The method of claim 1, wherein the second phase is initiated prior to completion of the first phase.

12. The method of claim 1, wherein a second designated work item in the first phase is defineable by the actor to become an obsolete work item.

13. The method of claim 1, wherein the constraints on the business process are defineable by the actor to prevent the designated work item from becoming an obsolete work item.

14. A workflow server that implements a structured workflow system, the workflow server comprising:
- a first data storage storing structured work items, wherein each work item is a data object representing a task to be performed by an actor, wherein an actor is one or more of a person, a group of persons and a machine, the structured work items being defined for a business process by a business process generator;
- a second data storing local work items, wherein a local work item is a data object input in response to the operation of the business process and in response to a variance from the business process defined by the business process generator;
- a workflow engine that is configured to process work items and local work items, including processing links between at least one work item and one local work item such that constraints on the business process set by the business process generator are followed in processing local work items,
- wherein the actor is assigned a first set of permissions representing security constraints on modifying and/or accessing elements of the first data storage, wherein an operator of the business process generator is assigned a second set of permissions, and wherein the second set of permissions includes at least one permission not included in the first set of permissions,
- wherein the business process includes a first phase and a second phase, wherein the second phase follows the first phase, wherein each of the work items and the structured work items is in one of the first phase and the second phase, and wherein the constraints on the business process are definable by the actor to move a designated work item from the first phase to the second phase.

15. The workflow server of claim 14, wherein the at least one permission not included in the first set of permissions is a permission to perform at least one of creating, modifying and deleting business processes from which structured work items in the first data storage are defined, and wherein the first set of permissions includes permission to perform at least one of creating, modifying and deleting local work items.

16. The workflow server of claim 14, wherein a third data storage is configured to store local work processes comprising a first set of business processes generated by an actor in variance from a second set of business processes defined by the business process generator.

17. The workflow server of claim 14, wherein a second designated work item in the first phase is definable by the actor to become an obsolete work item.

18. The workflow server of claim 14, wherein the constraints on the business process are definable by the actor to prevent the designated work item from becoming an obsolete work item.

19. A non-transitory computer readable medium storing instructions that, when executed by a workflow server that implements a structured workflow system, control the workflow server to execute processing comprising:
- storing structured work items in a first data storage, wherein each work item is a data object representing a task to be performed by an actor, wherein an actor is one or more of a person, a group of persons and a machine, the structured work items being defined for a business process by a business process generator;
- storing local work items in a second data storage, wherein a local work item is a data object input in response to the operation of the business process and in response to a variance from the business process defined by the business process generator;
- processing work items and local work items by a workflow engine, including processing links between at least one work item and one local work item such that constraints on the business process set by the business process generator are followed in processing local work items,
- wherein the actor is assigned a first set of permissions representing security constraints on modifying and/or accessing elements of the first data storage, wherein an operator of the business process generator is assigned a second set of permissions, and wherein the second set of permissions includes at least one permission not included in the first set of permissions,
- wherein the business process includes a first phase and a second phase, wherein the second phase follows the first phase, wherein each of the work items and the structured work items is in one of the first phase and the second phase, and wherein the constraints on the business process are definable by the actor to move a designated work item from the first phase to the second phase.

* * * * *